UNITED STATES PATENT OFFICE.

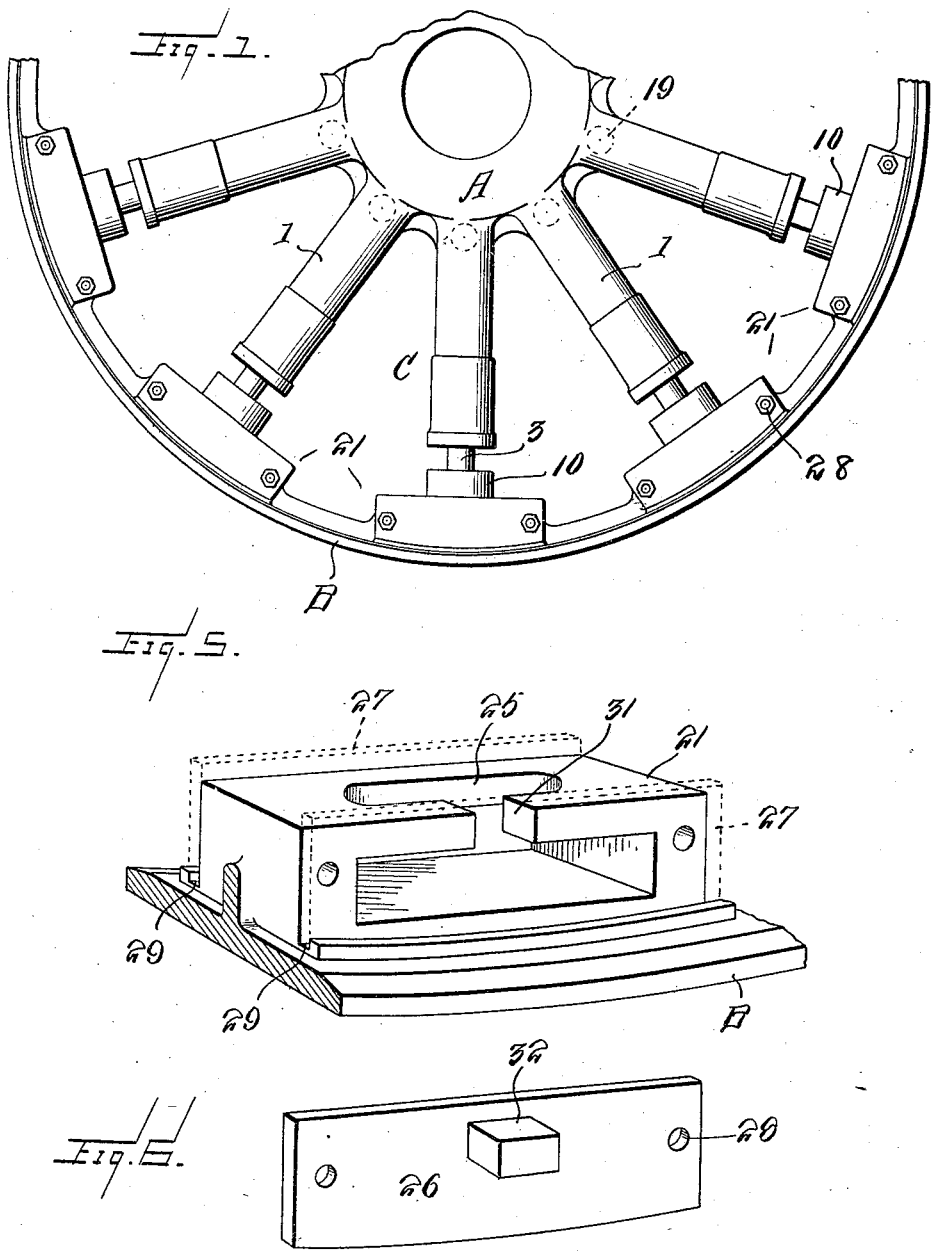

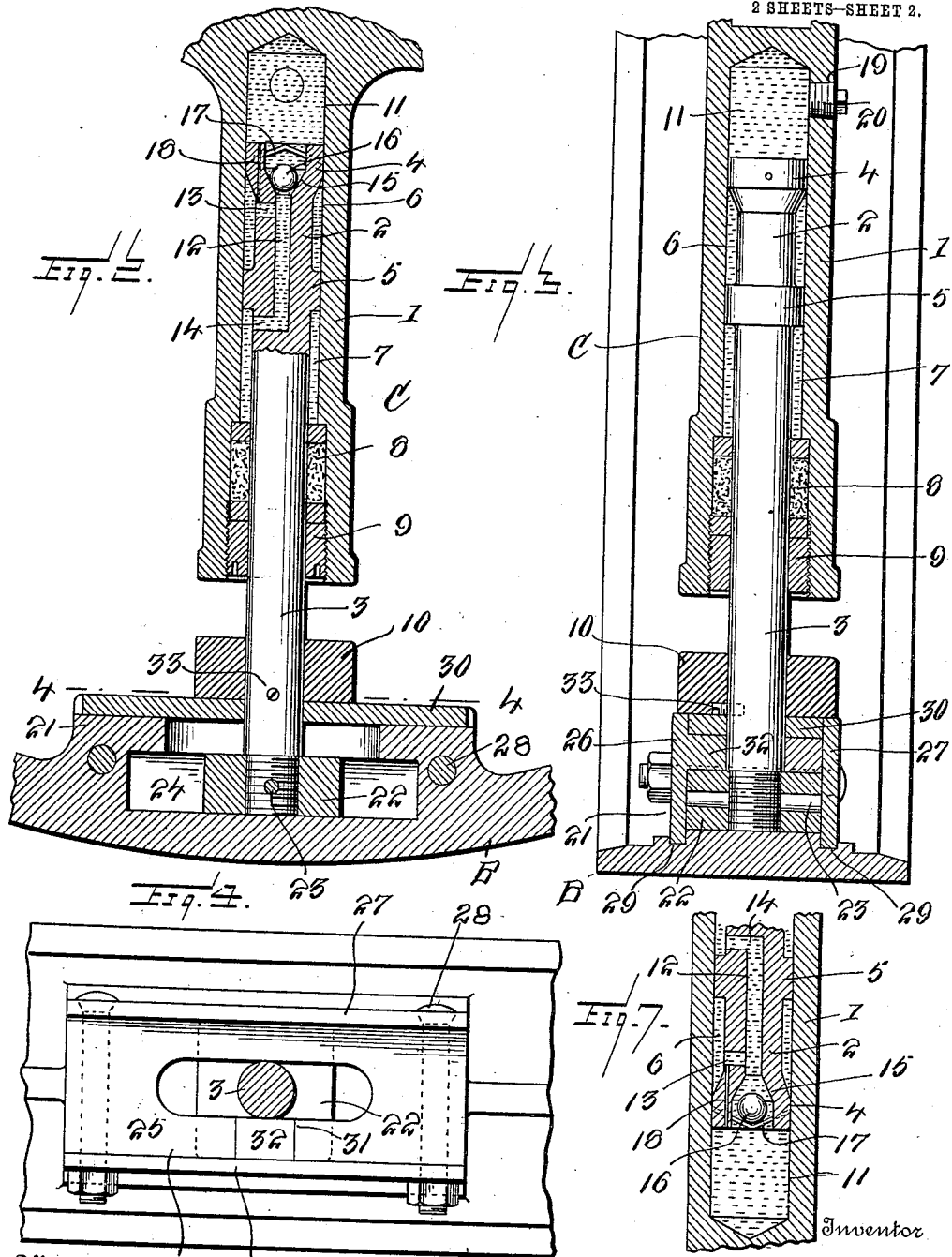

LEVI B. WILSON, OF PHILADELPHIA, PENNSYLVANIA.

AUTOMOBILE-WHEEL.

1,057,907. Specification of Letters Patent. Patented Apr. 1, 1913.

Application filed August 5, 1911. Serial No. 642,432.

*To all whom it may concern:*

Be it known that I, LEVI B. WILSON, a citizen of the United States of America, residing at Philadelphia, in the county of Philadelphia and State of Pennsylvania, have invented new and useful Improvements in Automobile-Wheels, of which the following is a specification.

This invention relates to automobile wheels of that type consisting of relatively movable hub and rim sections, the spokes including hydraulic cushioning devices so as to absorb the shocks incident to the passage of the vehicle over obstructions in the roadway and dispensing with the use of pneumatic tires.

The invention has for one of its objects to improve and simplify the construction and operation of wheels of this character so as to be comparatively simple and inexpensive to manufacture, reliable and efficient in use and so designed that a maximum shock absorbing effect will be obtained.

Another object of the invention is to provide an improved hydraulic cushioning means in the spokes so that shocks will not be transmitted to the vehicle body.

Another object of the invention is to provide an improved connection between the spokes and rim so that relative circumferential movement will be provided and at the same time the inner hub section, together with the spokes, can be readily detached from the rim when necessary.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a partial side view of the wheel.
Fig. 2 is an enlarged view of one of the spokes and connecting means between the latter and rim, the section being taken parallel with the plane of rotation. Fig. 3 is a detail sectional view of one of the spokes taken at right angles to the plane of the section of Fig. 2. Fig. 4 is a sectional view on line 4—4 of Fig. 2, showing the cover plate removed. Fig. 5 is a perspective view of a portion of the rim. Fig. 6 is a perspective of one of the removable plates of the rim. Fig. 7 is a detail sectional view of the piston of the hydraulic cushioning device in each spoke, representing the spoke as having turned half around from the position shown in Fig. 2.

Similar reference characters are employed to designate corresponding parts throughout the several views.

Referring to the drawing A designates the hub section of the wheel and B the rim section thereof, the sections being connected together by spokes C. Each spoke includes a tubular member or cylinder 1 that may be integrally connected to the hub A and movable therein is a piston 2 formed on the inner end of a rod 3 that extends beyond the outer end of the cylinder member 1 and connects with the wheel rim B. The piston is formed with heads 4 and 5 that are spaced apart to inclose an annular chamber 6 and outwardly from the head 5 is another annular chamber 7 that is closed by a packing 8 which surrounds the rod 3, the said packing being held under compression by a gland 9, which is threaded in the open outer end of the cylinder member of the spoke. This gland sets into the member 1 so that the latter can strike a cushioning block 10 of rubber or other suitable material when the rim moves inwardly to the maximum extent and as the gland 9 is set into the member it will not strike the cushioning block 10 and become loosened thereby. The packing and gland form a substantial bearing or support for the rod section 3 of the spoke at an intermediate point. A chamber 11 is provided between the inner end of the piston and spoke member for containing a suitable fluid by which the shocks are absorbed. The piston 2 has a longitudinal passage 12 that is connected by branches 13 and 14 with the chambers 6 and 7 respectively, the passage communicating at one end with the chamber 11. The passage is provided with a seat 15 for a ball valve 16 that controls communication between the passage 12 and chamber 11. This ball valve is held in coöperative relation with the seat by a bar or retainer 17 that extends across the mouth or open end of the passage 12 and thereby prevents the ball from jumping out of the piston.

A by-pass 18 of restricted area extends through the head 4 of the piston and communicates respectively with the chamber 11 and branch 13 of the passage 12. By means of this by-pass the fluid in the chamber 11 can gradually escape past the closed valve 15 when the piston 3 moves inwardly by a shock imparted to the rim. The fluid device after leaving the by-pass or passage 18 enters the chamber 6 almost directly and the chamber 7 indirectly through the passage 12 and branch 14. This flow of the fluid from the upper to the lower side of the piston heads allows the shocks sustained by the rim to be absorbed in an effective manner. At the same time this action takes place in the bottom spoke a different action takes place in the upper spoke, as will be understood by reference to Fig. 7. The piston is represented as moving outwardly and the fluid in the chambers 6 and 7 has a free outlet to the chamber 11 as the ball valve drops open or away from its seat as the spoke in the revolving of the wheel rises above a horizontal position and besides the suction produced by the outer movement of the piston insures the opening of the ball valve. It will thus be seen that the cushioning or shock absorbing effect takes place in the spokes at the lower part of the wheel because the hydraulic medium passes from one side of the piston to the other through the restricted passage 8, whereas in the upper spokes the hydraulic medium passes from one side of the piston to the other through the relatively large passage 12. Fluid is admitted to the cylinders of the spokes by means of filling openings 19 that are normally closed by plugs 20.

The rod members 3 of the spokes are yieldingly and removably connected with the rim section. For this purpose the rim B is formed around its inner surface with a plurality of rectangular bosses 21 that are chambered so as to form guides in which slide cross heads 22 that are threaded on the outer ends of the rod sections 3 of the spokes and also secured by pins 23 passing through the cross heads and rods 3. The chamber 24 has slots 25 in the wall nearest the hub so as to permit the rod 3 that enters the chamber to slide back and forth in the relative circumferential movement of the hub and rim sections and while the wheel is rotating the cross head 22 bears against the end wall of the chamber 24 so as to form a rigid driving connection between the spokes and rim. When reversing the direction of travel the cross heads slide in the chambers 24 and bear against opposite end walls thereof. The chamber 24 of each boss 21 may be opened in opposite sides and these open sides are covered by plates 26 and 27 that are fastened thereto by bolts 28. The outer edges of the plates 26 and 27 set in grooves 29 formed in the rim at the sides of the boss 21. The inner edges of these plates project inwardly from the flat inner face of the boss 21 so as to form a guideway for a cover plate 30 through which the rod 3 of the spoke passes, the said cover plate closing the slot 25 and freely slidable back and forth on the boss 21. The slot 25 of each boss 21 has one side open at 31 so that in removing the hub and spokes from the rim the rod section 3 of the spokes will pass out of the slots 25 through the open sides 31 thereof. On the plate 26 is a filler lug 32 so arranged as to completely fill the opening 31 in the side of each slot 25 and the inner face of this lug is flush with the side wall of the slot so that as the spoke rod 3 moves in the slot it will have a smooth bearing. In removing the hub and spokes as a unitary structure from the rim it is merely necessary to remove all the plates 26 so that the rim can be separated laterally from the rest of the wheel. It will thus be seen that it is comparatively easy to take the wheel apart for the purpose of inspection or repair. The cover plates 30 are held on the spoke rods 3 by a screw 33 threaded in the rod 3 with the outer end projecting therefrom so as to engage over the plate 30, as shown in Fig. 3. The plates 30 are thus free to slide back and forth on the bosses 21, but they are prevented from moving inwardly on the rods 3.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In a wheel, the combination of a hub, spoke cylinders connected therewith and each containing fluid, a rim, pistons connected with the rim and reciprocating in the cylinders, each piston including a head for dividing the cylinders into separate chambers, each piston provided with a valve controlled passage for connecting the chambers together, and having a constantly open passage of restricted cross sectional area connecting the chambers together.

2. In a wheel, a spoke comprising a cylinder, a rod extending into the same, a packing around the rod, a piston on the inner end of the rod including spaced heads for forming separate chambers, said piston having a passage extending through the same and communicating with both chambers and with the space inwardly from the piston, and a check valve for opening the passage when the piston moves outwardly and closing the passage when the piston moves inwardly, said piston provided with a passage of restricted cross sectional area for restricting the flow of fluid into the chambers during the inward movement of the piston.

In testimony whereof I affix my signature in presence of two witnesses.

LEVI B. WILSON.

Witnesses:
   E. EDMONSTON, Jr.,
   N. K. McGEE.